US010169356B2

(12) United States Patent
Doroshenko

(10) Patent No.: US 10,169,356 B2
(45) Date of Patent: Jan. 1, 2019

(54) INTELLIGENT DATA CACHING FOR TYPEAHEAD SEARCH

(71) Applicant: Facebook, Inc., Menlo Park, CA (US)

(72) Inventor: Sergii Doroshenko, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 1085 days.

(21) Appl. No.: 13/777,997

(22) Filed: Feb. 26, 2013

(65) Prior Publication Data

US 2014/0244619 A1 Aug. 28, 2014

(51) Int. Cl.
G06F 17/30 (2006.01)
G06F 17/27 (2006.01)

(52) U.S. Cl.
CPC ...... G06F 17/30126 (2013.01); G06F 17/276 (2013.01); G06F 17/30221 (2013.01); G06F 17/30646 (2013.01); G06F 17/30657 (2013.01); G06F 17/30663 (2013.01)

(58) Field of Classification Search
USPC ........................................................ 707/722
See application file for complete search history.

(56) References Cited

U.S. PATENT DOCUMENTS

| 7,398,271 | B1 * | 7/2008 | Borkovsky | G06F 17/30864 |
| 7,602,785 | B2 * | 10/2009 | Dharmapurikar | H04L 45/7457 370/392 |
| 8,370,329 | B2 * | 2/2013 | Gutt | G06F 17/30648 707/721 |
| 2005/0195832 | A1 * | 9/2005 | Dharmapurikar | H04L 45/7457 370/395.31 |
| 2006/0083247 | A1 * | 4/2006 | Mehta | H04L 45/00 370/395.32 |
| 2008/0104037 | A1 * | 5/2008 | Bierner | G06F 17/3064 |
| 2008/0133864 | A1 * | 6/2008 | Hinkle | G06F 12/0804 711/170 |
| 2010/0070448 | A1 * | 3/2010 | Omoigui | H01L 27/1463 706/47 |
| 2010/0098081 | A1 * | 4/2010 | Dharmapurikar | H04L 45/7457 370/392 |
| 2010/0306249 | A1 * | 12/2010 | Hill | G06F 17/30867 707/769 |
| 2011/0320441 | A1 * | 12/2011 | Lee | G06F 17/30867 707/723 |
| 2012/0166182 | A1 * | 6/2012 | Ko | G06F 17/276 704/9 |
| 2012/0271719 | A1 * | 10/2012 | Straley | G06Q 30/02 705/14.66 |
| 2013/0024443 | A1 * | 1/2013 | Achuthan | G06F 17/30392 707/722 |

(Continued)

*Primary Examiner* — Kim T Nguyen
(74) *Attorney, Agent, or Firm* — Baker Botts L.L.P.

(57) ABSTRACT

Techniques for providing low latency incremental search results are disclosed herein. According to one embodiment, a method for incremental search includes receiving a first search query from a user, obtaining a plurality of first search results in response to the first search query from an index server, determining whether the plurality of first search results are a substantially exhausted list of results for the first search query, and caching the plurality of first search results in a cache storage if the plurality of first search results are the substantially exhausted list of results for the first search query.

13 Claims, 8 Drawing Sheets

(56) References Cited

U.S. PATENT DOCUMENTS

| | | | |
|---|---|---|---|
| 2014/0188935 A1* | 7/2014 | Vee | G06F 17/3043 |
| | | | 707/771 |
| 2014/0207748 A1* | 7/2014 | Sood | G06F 17/3097 |
| | | | 707/706 |
| 2014/0222854 A1* | 8/2014 | Lee | G06F 17/30958 |
| | | | 707/767 |

* cited by examiner

INTELLIGENT DATA CACHING FOR TYPEAHEAD SEARCH

FIELD OF THE INVENTION

This invention relates generally to data search and retrieval, and in particular to a data search system handling incremental data search.

BACKGROUND

Modern computing systems store vast amounts of data, and as a consequence it has become increasingly important to provide users with effective ways to locate information that is relevant to their interests. One area in which large amounts of information are involved is social networking Social networking systems allow users to designate other users as friends (or otherwise connect to or form relationships with other users), contribute and interact with media items, use applications, join groups, list and confirm attendance at events, create pages, and perform other tasks that facilitate social interaction. Since each of these tasks may involve various data objects, social networking systems are good examples of the demand for systems that help users locate relevant information from within a large set of information tracked or otherwise used by the system.

Although it might be helpful to customize a search for a user's particular needs, the search task can consume a significant amount of computer power and have a noticeable latency between receiving the search query and presenting the search results. The problem of latency becomes vital particularly for incremental search. Incremental search (also referred to as typeahead, incremental find, real-time suggestions, autocomplete, search as you type, filter/find as you type, inline search, instant search, or word wheeling) is a user interaction interface method capable of progressively searching for and filtering through data. As a user of an incremental search interface types text, one or more possible matches for the typed text are found and immediately presented to the user. This immediate feedback mechanism may allow the user to choose a closely related option from the presented list of suggested results, before typing the entire word or phrase they were searching. When there is a noticeable latency between the user typing the text and the interface presenting the search result list, the user experience with the incremental search interface deteriorates.

SUMMARY

The technology introduced here provides the benefits of providing incremental search results with low latency. In particular, the technology introduced here includes a method for providing low latency incremental search feature by caching the search results. As a user types a shorter text, the method sends an inquiry including the typed shorter text to a search engine and receives a group of search results. If the search results are exhausted results for the inquiry, the method caches the search results in the search engine server. As the user continues to type a longer text, the method sends another inquiry including the longer text to the search engine to search only in the cached results to achieve a low latency and low burden incremental search. In order to ensure that the search inquiry expression for the shorter text is a prefix for the search inquiry expression for the longer text, the method uses an expression generator (rewriter) that is aware of the caching mechanism and maintains the superset-subset relationship between the inquiry expressions. In one embodiment, the method uses hash values of the inquiry expressions as the identifiers to locate and match the cached search results.

In accordance with the techniques introduced here, therefore, a method for incremental search is provided. The method includes receiving a first search query from a user, obtaining a plurality of first search results in response to the first search query from an index server, determining whether the plurality of first search results are a substantially exhausted list of results for the first search query, and caching the plurality of first search results in a cache storage if the plurality of first search results are the substantially exhausted list of results for the first search query.

In accordance with the techniques introduced here, therefore, another method for incremental search is also provided. The method includes receiving a plurality of initial keystrokes from a user device, obtaining a plurality of first search results based on a first search query including the initial keystrokes from an index server, caching the plurality of first search results in a cache storage, receiving one or more additional keystrokes from the user device, generating one or more second search results by searching the first search results in the cache storage based on a second search query including the initial keystrokes and additional keystrokes, and transmitting the second search results to the user device in real time.

In accordance with the techniques introduced here, therefore, a computer server for incremental search is also provided. The computer server includes a networking component, a cache storage, a process and a memory. The networking component is configured for receiving a plurality of initial keystrokes and later one or more additional keystrokes from a user device and for obtaining from an index server a plurality of first search results based on a first search query including the initial keystrokes. The cache storage is configured for caching the plurality of first search results. The memory storing instructions which, when executed by the processor, cause the computer server to perform a process including generating one or more second search results by searching the first search results in the cache storage based on a second search query including the initial keystrokes and additional keystrokes. The networking component is further configured for transmitting the second search results to the user device in real time.

Other aspects of the technology introduced here will be apparent from the accompanying figures and from the detailed description, which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this description to "an embodiment", "one embodiment", or the like, mean that the particular feature, function, or characteristic being described is included in at least one embodiment of the present invention. Occurrences of such phrases in this description do not necessarily all refer to the same embodiment, nor are they necessarily mutually exclusive.

Figure 1:
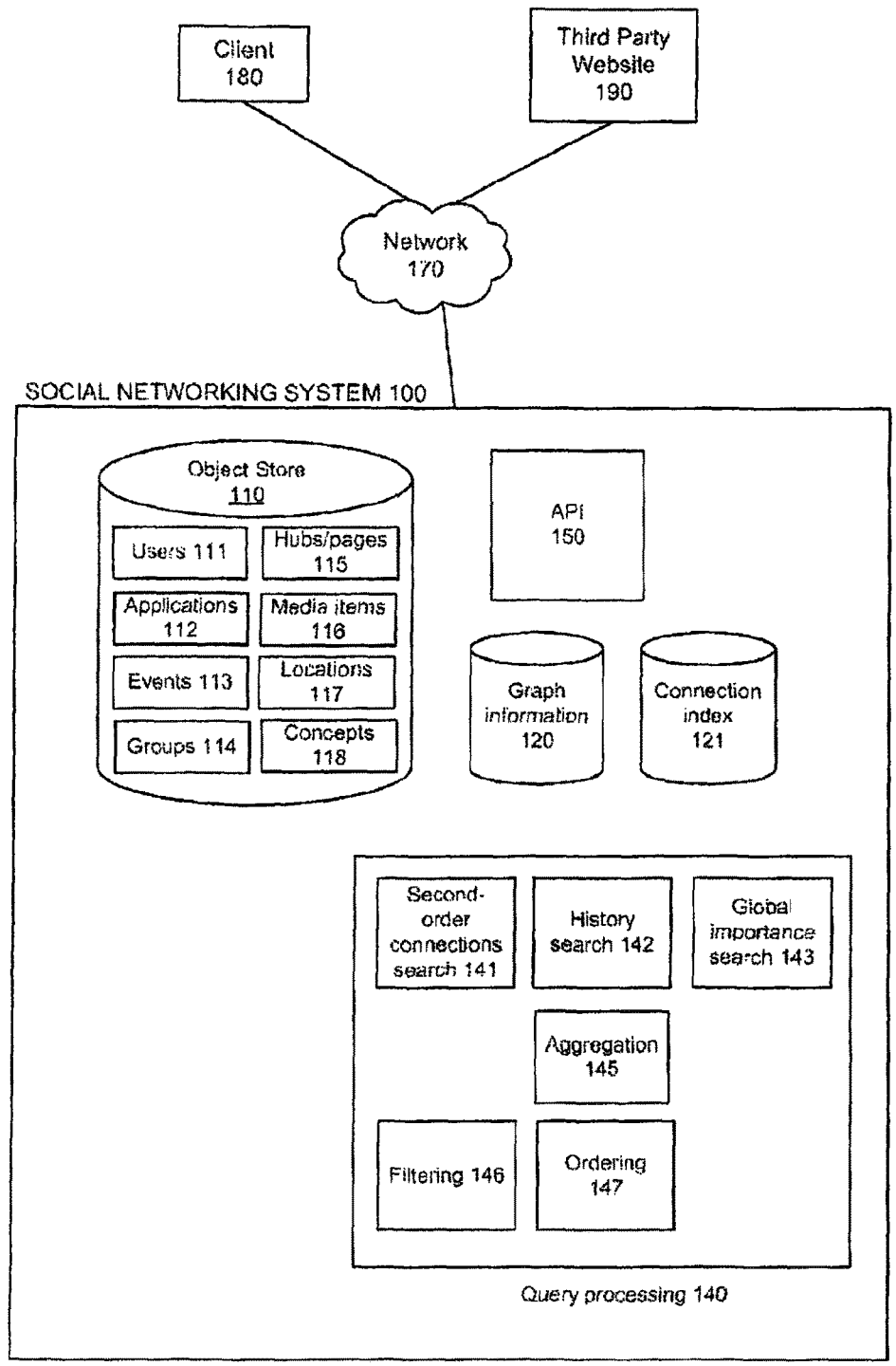
FIG. 1 is a high-level block diagram of an example computing environment.

FIG. 1 is a high-level block diagram of a computing environment according to one embodiment. FIG. 1 illustrates a social networking system 100, a client device 180, and a third party website 190 connected by a network 170. A user of the client device 180 interacts with the social networking system 100 via an application such as a web browser, performing operations such as browsing content, posting messages, performing queries for people or other content of interest, and the like. Additionally, the third party website 190 can also interact with the social networking system 100 via a system-provided application programming interface (API) 150. For example, the third party website can perform operations supported by the API, such as performing queries to obtain information stored by the social networking system 100.

The social networking system 100 comprises a number of components used to store information on objects represented in or by the social networking environment, and on the relationships of the objects. The social networking system 100 additionally comprises components to enable clients of the system—such as a human user of the client device 180 interactively using the system, or a component of the third party website 190 requesting information—to query the system for information of interest.

More specifically, the social networking system 100 comprises an object store 110 that stores information on various objects tracked by the social networking system 100.

These objects may represent a variety of things with which a user may interact in the social networking system 100, including, without limitation, other users 111 of the social networking system (represented, e.g., as a profile object for the user), applications 112 (e.g., a game playable within the social networking system), events 113 (e.g., a concert that users may attend), groups 114 to which users may belong, pages or hubs 115 (e.g., pages constituting a particular organization's presence on the system), items of media 116 (e.g., pictures, videos, audio, text, or any other type of media content), locations 117 associated with a user (e.g., "Santa Clara, Calif., USA"), and even concepts 118 or other terms (e.g., "Victorian literature"). The object store 110 may further store objects representing other data routinely produced by users of the social networking system 100, such as inbox messages, status updates, photos, videos, comments, notes, and postings. An object in the object store 110 may represent an entity existing within the social networking system (e.g., an application 112 available on the social networking system), a virtual entity that exists outside the domain of the social networking system (e.g., a website), or a real-world entity (e.g., a sports team or a retail store).

The object store 110 may store all of the objects existing within the social networking system 100, such as the code of an application 112, or the image data associated with an image media item 116. Alliteratively, for virtual entities existing outside of the social networking system 100, the object store 110 may contain some form of pointer or reference to the entities, such as the uniform resource locator (URL) of an external media item 116. Additionally, the object store 110 may also store metadata associated with the objects, such as a name describing the object (e.g. "Charles Williams" for a person, "Birthday Reminder" for an application, or "Penguin Fanciers" for a group), an image representing the object (e.g., a user profile picture), or one or more tags assigned to the object by users (e.g. the textual strings "game", "crime", and "strategy" for a strategy game application). Different types of objects may have different types of metadata, such as a set of associated users 111 for a group 114, a media type (e.g., "video") for a media item object 116, and a unique user ID and name tokens (e.g., separate first and last names "Charles" and "Williams") for a user object 111.

In one embodiment, the social networking system 100 further comprises a graph information store 120 that represents the objects of the object store 110 as nodes that are linked together in a "social graph." The graph information store 120 thus comprises information about the relationships between or among the objects, represented as the edges connecting the various object nodes. Various examples of edges in the social graph include: an edge between two user objects representing that the users are have a relationship in the social networking system (e.g., are friends, or have communicated, viewed the other's profile, or interacted in some way), an edge between a user object and an application object representing that the user has used the application, an edge between a user object and a group object representing that the user belongs to the group, and an edge between a user object and a page object representing that the user has viewed the page, to name just a few. For example, if one user establishes a relationship with another user in the social networking system, the two users are each represented as a node, and the edge between them represents the established relationship; the two users are then said to be connected in the social network system. Continuing this example, one of these users may send a message to the other user within the social networking system. This act of sending the message is another edge between those two nodes, which can be stored and/or tracked by the social networking system. The message itself may be treated as a node. In another example, one user may tag another user in an image that is maintained by the social networking system. This tagging action may create edges between the users as well as an edge between each of the users and the image, which is also a node. In yet another example, if a user confirms attending an event, the user and the event are nodes, where the indication of whether or not the user will attend the event is the edge. Using a social graph, therefore, a social networking system may keep track of many different types of objects and edges (the interactions and connections among those objects), thereby maintaining an extremely rich store of socially relevant information.

In one embodiment, edges in the graph information store 120 have associated metadata, such as a label describing the type of relationship (e.g., "friend" as the label between two user objects), or a value quantifying the strength of the relationship. Further, a relationship degree, or "distance," between any two objects can be ascertained by determining the number of edges on the shortest path between the objects. For example, two user objects that have an edge between them (e.g., denoting a friendship relationship) have a relationship degree (or "distance") of one and are considered first-order connections. Similarly, if a user object A is a first-order connection of user object B but not of user object C, and B is a first-order connection of C, then objects A and C have a relationship degree of two, indicating that C is a second-order connection of A (and vice-versa).

In one embodiment, the social networking system 100 adds information to the graph information store 120 in real time as it observes events taking place indicating relationships between the various objects, such as a user 111 interacting with an application 112. Alliteratively and/or additionally, the graph information store 120 may be created based on existing stored information from which relationships can be inferred. For example, the friend list of a user 111 might indicate that the user has a friend relationship with another user, or the data for a group 114 might indicate that some set of users has a membership relationship with that group, and this information could be reflected in the graph information store 120.

In one embodiment, the social networking system comprises a connection index 121 that stores a subset of the information in the graph information store 120 in a manner that allows rapid queries of that information. For example, in one embodiment the connection index 121 stores, for each user, a list of all of the connections between that user and other users. This allows, for example, a rapid determination of other users to whom the user has a direct or indirect connection (e.g., friends-of-friends) and the order of their connection (e.g., 2, for friends-of-friends).

The social networking system 100 further comprises a query processing module 140 that identifies objects from the object store 110 that match a particular search query. In one embodiment, the searching user directly provides a textual query by typing text into a text area associated with query functionality of a user interface. In other embodiments the user provides a non-textual query that is translated to a textual query, such as selecting a list item with associated text that serves as the search query text. The search query can be issued in a user-specific query context, such as when a searching user has logged in to the social networking system 100 either from a web site of the social networking system or from the third party website 190 that accesses data of the social networking system. In a user-specific context, the social networking system 100 can leverage the information that it stores about the searching user and about the various objects in the object store 110 to predict one or more objects that are likely to be of interest to the query user, given the search query or a portion thereof.

The query processing module 140 contains a number of sub-modules 141-143 that identify objects according to different search algorithms, an aggregation sub-module 145 that combines the results from the various sub-modules, and filtering and ordering sub-modules 146 and 147 that modify the contents and/or order of the combined results. These various sub-components of the query processing module 140 are now described in more detail.

The second-order connections search sub-module 141 identifies first-order and second-order user connections of the searching user that match the query. Specifically, the second-order connections search sub-module 141 identifies a set comprising the first-order connections of the searching user having object types of interest, such as user objects 111 and page objects 115. The second-order connections search sub-module 141 then further identifies a set of all the first order connections of the objects within the identified set (other than the searching user itself), this latter set of connections constituting the second-order connections of the searching user. Finally, the second-order connections search sub-module 141 produces, as its result set, all of the identified first-order and second-order connections that match the query according to some query matching algorithm, such as a prefix substring match. In one embodiment, the second-order connections search sub-module 141 performs a separate search, and produces a separate result set, for each of the types of interest, such as one search and result for user objects 111, one for page objects 115, and the like. Alliteratively, the second-order connections search sub-module 141 may return a single result set containing both the first-order and second-order connections, or it may return a separate result set for each.

It is appreciated that although the second-order connections search sub-module 141 has been described as returning first- and second-order connections, any number of orders of connection could be returned. For example, the sub-module could also return connections of third order, in addition to those of first and second order.

In one embodiment, in order to decrease the time needed for the search, the second-order connections search sub-module 141 performs the search with reference to the connection index 121.

The history search sub-module 142 identifies, among objects stored in the history of the searching user, objects that match the query. In one embodiment the history for the search user is not stored within the social networking system 100 itself, but rather is cached on the client device 180 of the particular searching user 111 to whom it pertains. That is, as a particular searching user represented by a user 111 in the object store uses his or her client device 180 to communicate with other users 111, to use applications 112, and the like, the corresponding objects are cached on the client device. Similarly, portions of the connection index 121, such as first-order user connections of the searching user, can likewise be cached on the client device 180. Regardless of the exact storage location of the history for the searching user, the history search sub-module 142 examines each of the objects within the history and identifies those matching the query, according to some match algorithm.

The global importance search sub-module 143 identifies, among objects considered to be of global importance, objects that match the query. The globally important objects need not have any specific relationship with the searching user, but rather are considered to be of general interest across users of the social networking system 100 as a whole. The objects to be placed within the globally important group 131C may be identified in different ways. For example, objects may be considered to be globally important if they have been accessed (e.g., viewed), tagged, posted, marked as having one or more fans, or otherwise designated as being of interest, some pre-specified number of times. Alliteratively, actions such as accessing/tagging/posting may be used to calculate a score, and the objects with the top N scores may be selected as globally important objects, for some integer N. In one embodiment, the globally important objects, or references thereto, are stored in a distinct portion of the object store 110 so that they are readily available for searches by the global importance search sub-module 143. The global importance search sub-module 143 then selects as its result set, from among the objects of global importance, those objects that match the query according to some match algorithm.

In one embodiment, the match algorithm used by one or more of the sub-modules 141-143 is a case-insensitive prefix search that compares the query with prefixes of various portions of the metadata, such as the first name, last name, and/or nickname of a user object 111, a title of an application object 112, and the like. The match algorithm, or another component of the social networking system 100, may additionally process the query text and/or the metadata of the various objects prior to performing the match in order to allow provide greater flexibility in the matching. For example, the query processing module 140 could take into account that the first name "Mike" is a well-known alternative for the first name "Michael," such that typing "Michael" would match "Mike", as well, even though "Mike" does not contain the prefix "Michael." In some embodiments, the match algorithm additionally compares the query to data other than object names, such as words in tags assigned to objects, or synonyms of such words.

The aggregation sub-module 145 receives the result sets produced by each of the search sub-modules 141-143 and aggregates them into a single combined result set to be presented to the user. The aggregation module 145 removes duplicates of objects that occur multiple times across the various result sets, such as a user object 111 that occurs in the result sets for the second-order connections search sub-module 141 and for the history search 142.

In one embodiment, the filtering sub-module 146 filters the combined result set based on an affinity measure of the searching user for each of the objects. In different embodiments, the affinity measure is a function of one or more of a physical distance (e.g., a residence location of a user object in the matching set must be within N miles of a residence location of the searching user), a graph distance between the user object 111 of the searching user and objects of the matching set on the social graph (e.g., the distance must be 2 or less), and a similarity measure.

The similarity measure quantifies how likely the searching user would be to find a particular matching object to be of interest, and may be calculated in different ways in different embodiments. For example, the similarity measure may be calculated by comparing a user profile of the searching user to the matching object, such as by noting that the user profile states that the searching user enjoys golf and that the matching object is a group 114 devoted to golf. Alternately and/or additionally, the similarity measure may be calculated by determining interests of the searching user based on past actions of the searching user within the social networking system, such as posting messages related to golf or using golf game applications 112, and comparing the determined interests to information about the matching object. The physical distance, graph distance, and the similarity measure can be considered, individually or collectively, to constitute an "affinity" of the searching user for the object in question.

The filtering module 146 may further filter the matching objects based on additional criteria. For example, when the query processing module 140 is matching objects on behalf of a third party website 190 that rents movies, it could filter the identified objects to include only those objects having the keyword "movie" (or synonyms such as "film"), within their metadata, for example. Embodiments may use any of a variety of criteria for filtering the search results based on contextual information about the system in which the search interface is presented to the user.

In one embodiment, the ordering module 147 further imposes an ordering on the initial and/or filtered matching objects of the combined result set. The order may be based on the affinity measure discussed above, e.g., with geographically closer objects ordered higher than geographically farther objects. Other factors may additionally and/or alternatively be taken into consideration when determining the order, such as the search sub-module 141-143 from which an object came, e.g., user-specific objects returned by the history search sub-module 142 tending to be ordered more highly than those in the non-user-specific globally important group 131C.

Additionally, the query ordering module 147 can divide the matching objects into groups and order each group separately, each group having its own ordering criteria. The groups may correspond to the various result sets provided by the search sub-modules 141-143, or the groups may be defined in other ways. For example, user objects 111 from the result set provided by the second-order connections search module 141 may be displayed in a "friends" group separate from objects of other groups and ordered according to the graph distance of the various friends. Further, first-degree friends (friends with graph distance 1) may be placed into a separate sub-group ordered according to geographic distance of the friends, and second-degree friends may be placed into a sub-group ordered according to a number of mutual friends.

In one embodiment, the filtering and/or ordering operations may be performed by the search sub-modules 141-143, rather than by (or in addition to) the filtering and ordering modules 146-147. For example, the second-order connections search sub-module 141 can group the first-order and second-order connections and order the second-order connections according to numbers of mutual connections.

The query processing module 140 may select the information about the objects that are returned in the combined result set, such as selecting associated metadata such as object names or profile pictures, the actual content data associated with the object (e.g., the video data of a video media item), or some combination of the two.

The operations of the various query processing sub-modules 141-147 need not be static, but may be determined in a dynamic manner based on options provided along with the query. That is, the objects that are returned in the various result sets, their various groupings and order, the filtering criteria that are application to them, the associated information that is provided on them, and the like, may all be specified dynamically based on options provided along with the query. For example, the query might include not only the query text itself (e.g., the string "Eli" in the example above), but also an option specifying that only objects from the result sets provided by the second order connections search sub-module 141 and the global importance search sub-module 143 should be included, and an option specifying that the users from the second order connections search sub-module should be grouped with first-order connections preceding second-order connections, where the former is ordered according to geographic proximity and the latter is ordered according to number of mutual connections, for example. In one embodiment, the options may be specified by the user, either directly, or indirectly based on pre-specified user preference settings.

As described above, the social networking system 100 provides the search functionality to its users within the system 100. In other embodiments, however, the social networking system 100 may export this search capability to third-party systems, thereby expanding aspects of the social networking environment outside of the actual social networking system 100. For example, the social networking system 100 may comprise an application programming interface (API) 150 used to access information stored by the social networking system, such as the various objects of the object store 110. For example, the functionality of the query processing module 140 can be exposed to other applications via the API 150. In one embodiment, the API can be accessed both locally and remotely. For example, the API 150 may be accessed via a locally-loaded module, such as a DLL, or it may be may be accessed remotely as a web service by a third party website 190 or other remote system.

Figure 2A:
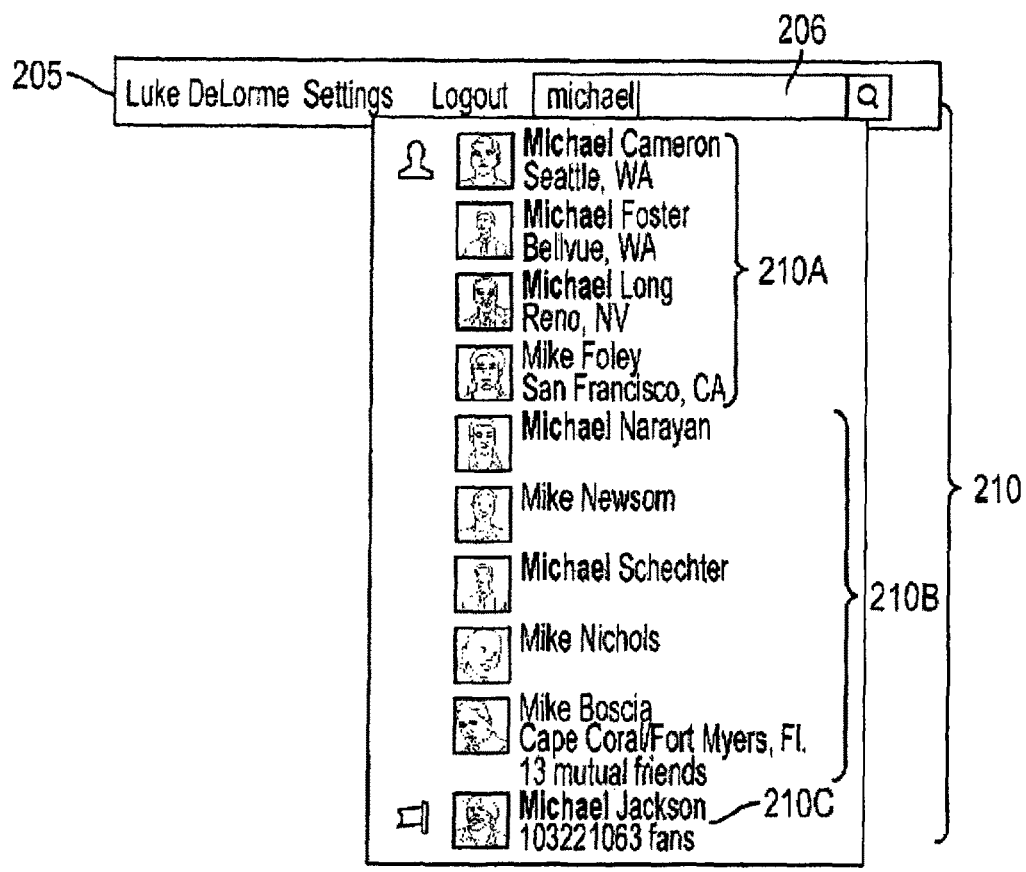
FIG. 2A illustrates a query entered by a user in an example incremental search interface of a social networking system.
Figure 2B:
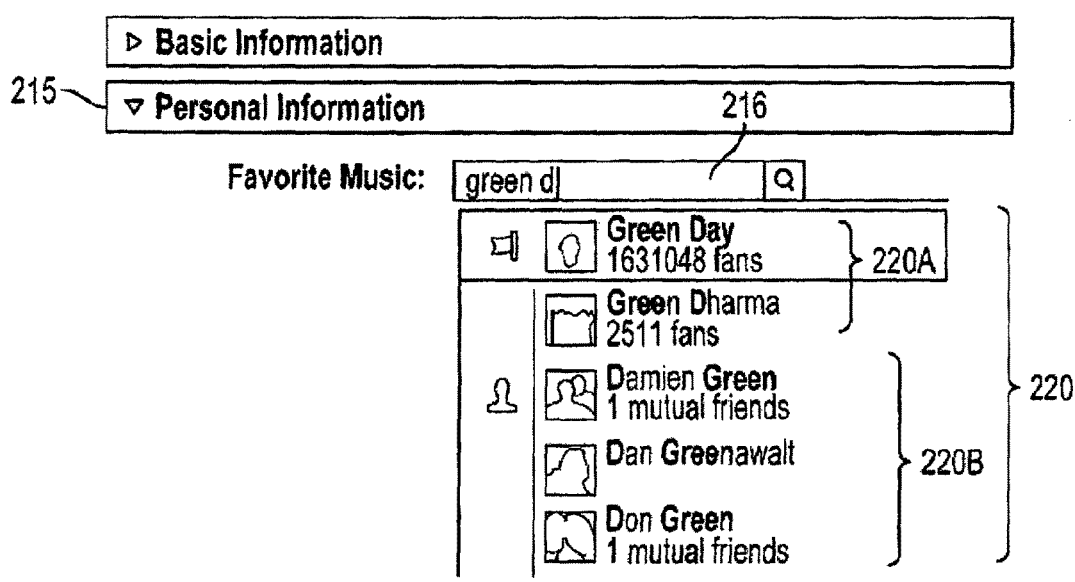
FIG. 2B illustrates a query entered by a user in a example user interface of the social networking system.
Figure 2C:
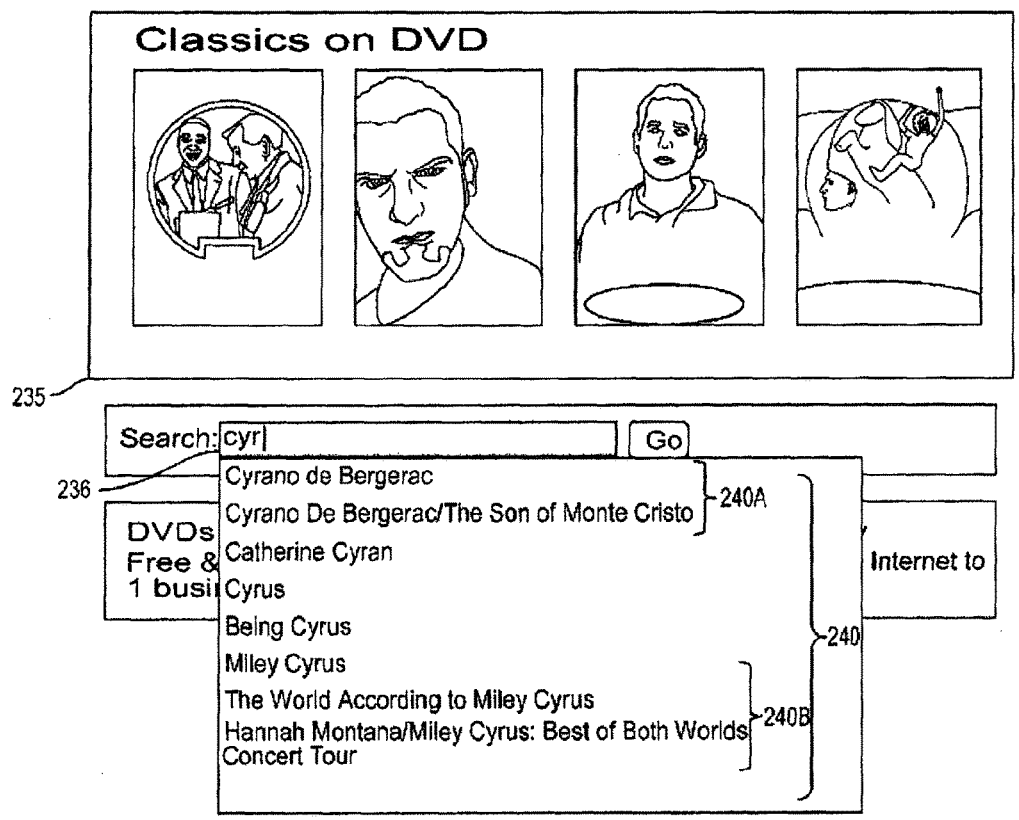
FIG. 2C illustrates use of a query entered by a user in a example user interface of a third party website separate from the social networking system, according to one embodiment.

FIGS. 2A-2C are screenshots illustrating different search contexts and displays of search results using the query functionality of the query processing module 140, according to one embodiment.

FIG. 2A illustrates a query entered by a user in a search interface of the social networking system 100. Specifically, FIG. 2A depicts a search bar 205 comprising a search query area 206 into which a user can enter a textual query string and receive a set of matching objects 210. In the example of FIG. 2A, the searching user has entered the query "michael", presumably searching for users 111 of that name. In response, the set of matching objects 210 is displayed, the matching objects all having the prefix "michael," (or "mike," a known equivalent thereof).

In the example of FIG. 2A, the matching objects 210 are displayed in groups, according to their type and/or relevance to the user who specified the query. For example, the first nine objects are users 111 that are first-order or second-order connections of the searching user and are found by performing a prefix search of the connection index 121. Of these nine users, four are in a sub-group of first-order connections 210A, and the remaining five are in a sub-group of second-order connections 210B. Each user 111 is displayed based on its degree of relationship with the searching user, with first-order connections displaying their addresses, and second-order connections displaying how many mutual friends they have in common with the searching user. The last of the matching objects 210, an object 210C for a page 115 dedicated to Michael Jackson, is not of specific relevance to the searching user—e.g., is not a first-order or second-order connection of the user—but is considered of global importance given its sheer aggregate popularity.

Within each group, the order of the various matching objects 210 can be determined based on the relevance of the object to the searching user, as calculated from the information on the searching user tracked by the social networking system 100. For example, as previously noted, the matching first- or second-order connections of FIG. 2A are ordered based on their degree of relationship, with the first-order connections displayed before the second-order connections. Further, FIG. 2A depicts another potential ordering based at least in part on a geographic proximity to the searching user. For example, for a searching user known to be from the state of Washington, the first-degree friends 210A are ordered such that friends also located in Washington precede those from other states, such as Nevada or California. Additionally, the second-order connections 210B are ordered based on their number of mutual connections in common with the searching user, with second-order connections with more mutual connections located higher in the result set.

FIG. 2B illustrates a query entered by a user in a user interface of the social networking system 100. More specifically, FIG. 2B depicts a portion 215 of a user profile listing the user's personal information, including a text field 216 for entering text specifying the user's favorite music. In a conventional user interface, the user would be obliged to enter the entire text string corresponding to the user's favorite music, but in the interface of FIG. 2B the social networking system 100 performs an implicit query as each character of the string is typed. In the depicted example, the user has typed the string "green d", and in response the page objects 220A with names "Green Day" and "Green Dharma" have been displayed, along with second-order connections 220B. If the user typed an additional character, such as 'h' (thereby forming the query string "green dh"), the query processing module 140 might narrow the search results 220 to contain only the page object for "Green Dahlia."

Note that the page objects 220A have been ordered above the second-order connections 220B, with the page objects further ordered based on number of fans (popularity), as is appropriate for a profile field in which the user is more likely to specify a concept or a group (e.g., a band or a musical genre) rather than an individual person. This ordering of groups 114 before users 111—or the ordering of the users before groups in FIG. 2A—could be specified, along with other rules, as part of the call to the API 150 through which the query processing module 140 is accessed. For example, scripting code within the web pages embodying the user interfaces of FIGS. 2A and 2B could call the API 150, specifying the rules by which the query results are to be ordered as parameters of the call. This permits different user interfaces to order the results in different ways appropriate to the context in which they are used. Similarly, API-specified rules could permit the exclusion of certain types or classes of objects, as appropriate for the context in which the objects are being matched. For example, when suggesting profile values for favorite music, as in the example of FIG. 2B, the social networking system 100 could specify that objects for groups 114, hubs/pages 115, media items 116, and concepts 118 should be included as matching objects, but that objects for users 111, applications 112, events 113, and locations 117 should be excluded on the assumption that they are unlikely to represent a preferred type of music or a particular preferred artist.

The query need not be specified within a user interface of the social networking system 100 itself. Rather, a third party website or other system may use an application programming interface (API) of the social networking system 100 to gain access to the information stored by the social networking system, thereby enhancing the information that the third party website provides. FIG. 2C illustrates use of a query entered by a user in a user interface of a third party website 190 separate from the social networking system 100, according to one embodiment. More specifically, FIG. 2C represents a portion 235 of a web-based user interface of a movie rental website 190, the website leveraging the information provided by the social networking system 100 to provide useful movie suggestions 240, such as suggestions tailored to a particular user.

In FIG. 2C, a user has entered the string "cyr" into a textual search field 236. In response, the third party website 190 has called the API 150 of the social networking system 100, e.g., using a web service interface, has received a number of objects from the query processing module 140, and has displayed a number of suggestions 240 based on the received objects. As described above with respect to FIG. 2B, parameters can be provided along with the query that specify what types of objects will be matched, how many objects will be matched, how the objects will be ordered in the matching set, and the like. The third party website 190 can present this information directly—i.e., showing each matching object in the same order as it was provided—or indirectly—e.g., showing a set of items derived from the objects.

As an example of indirect use of the matching objects, the set of objects matching the query "cyr" might include a user object 111 for a first-order user connection of the user named Slobodan Cyrcic and obtained from the result set of the second-order connections search sub-module 141, a hub/page object 115 about the play/film "Cyrano de Bergerac" obtained from the result set from the history search sub-module 142, and a group object 114 about the actress Miley Cyrus obtained from the globally important group 131C in the query group store. The movie rental website 190 could then determine that it had various titles related to the hub/page object "Cyrano de Bergerac," including the film "Cyrano de Bergerac" and the compilation "Cyrano de Bergerac/The Son of Monte Cristo," and various titles and/or categories related to the group object 114 devoted to Miley Cyrus, including the DVD "The World According to Miley Cyrus" and a "Hannah Montana tour" DVD. Additionally, the movie rental website 190 could list other titles or categories not derived from one of the matched objects, such as DVDs for the films "Cyrus" and "Being Cyrus" and search results for the actress Catherine Cyran, as found in its own inventory databases.

The third party website 190 could also use additional information stored by the social networking system 100 to provide better suggestions 240. For example, the third party website 190 could additionally obtain information from the query user's profile via the API 150 and analyze it to determine that the searching user is (for example) a middle-aged fan of foreign films. The website 190 could accordingly order the suggestions 240 so that those related to the foreign film "Cyrano de Bergerac" are placed high in the list, and those related to the youth-oriented Miley Cyrus items are placed low in the list.

Even if the searching user had not identified himself or herself by logging in or otherwise authorizing the third party website 190 to access the user's information on the social networking service 100, the third party website could still obtain non-user-specific information useful for formulating suggestions 240. For example, the third party website 190 would still have access to objects such as those provided by the global importance search sub-module 143, even if it lacked access to the user-specific objects provided by the second-order connections search 141 and the history search 142.

Figure 3:
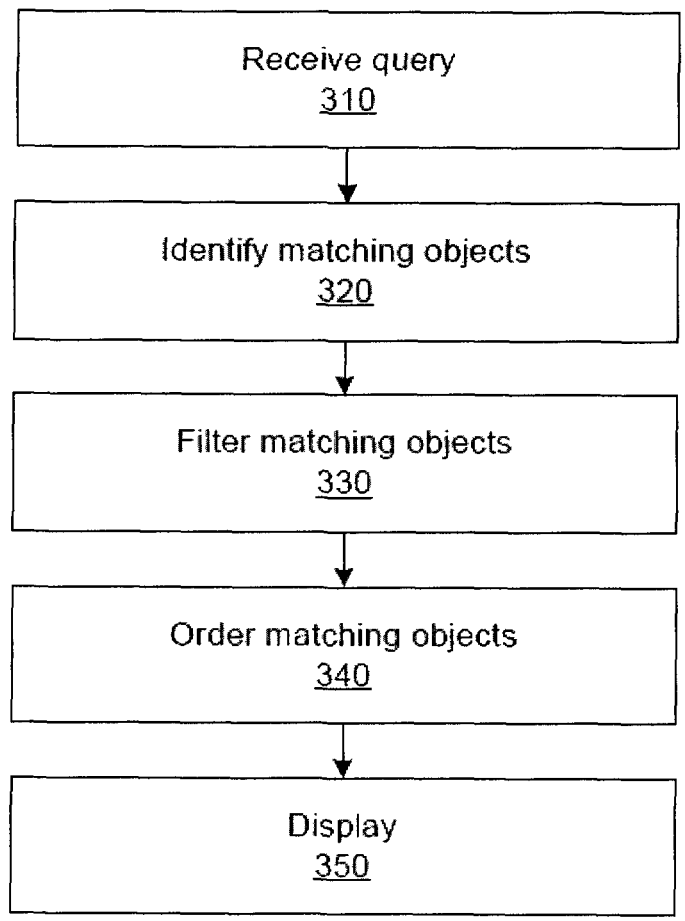
FIG. 3 is a flowchart of an example process for obtaining and displaying objects in response to a search query.

FIG. 3 is a high-level flowchart of an example process 300 for obtaining and displaying objects in response to a search query, according to one embodiment. Initially, a query is received at 310 by the social networking system 100. In one embodiment, the query is received from a user interface of the social networking system 100 itself. In another embodiment, the query is received from the third party website 190.

The social networking system 100 identifies at 320 objects from the object store 110 that match the received textual query. More specifically, various result sets are received from the various search algorithms of the search sub-modules 141-143, as described above with respect to FIG. 1. These result sets are then aggregated (e.g., by the aggregation module 145) into a single combined result set, with duplicate objects being removed.

Each of the matching objects may further be filtered at 330 based on an affinity measure of the searching user for the objects. In different embodiments, the affinity measure may comprise: a physical distance between a geographic location associated with the user with whom the query is associated and a geographic location associated with the object, a distance in a social graph between the object and a user object of the searching user, and a general similarity measure determined based on, for example, a user profile of the searching user, or past actions of the searching user within the social networking system 100. Other data may be used to measure affinity for matching objects.

The resulting objects are then ordered at 340 and/or grouped. As one example, the objects can be grouped according to a source from which the objects came, such as from the result sets provided by the second order connections, history, or global importance search sub-modules 141-143. The objects can further be ordered 340 based on the affinity measure, and/or upon other factors, such as the source from which they came. Alternatively and/or additionally, the various search algorithms by which the objects are identified at 320 may themselves perform filtering, ordering, and grouping operations.

Finally, the objects are displayed at step 350. In one embodiment, the objects are displayed in the user interface in which the query was entered, or the user interface of the third party website 190 depicted in FIG. 2C.

Figure 4:
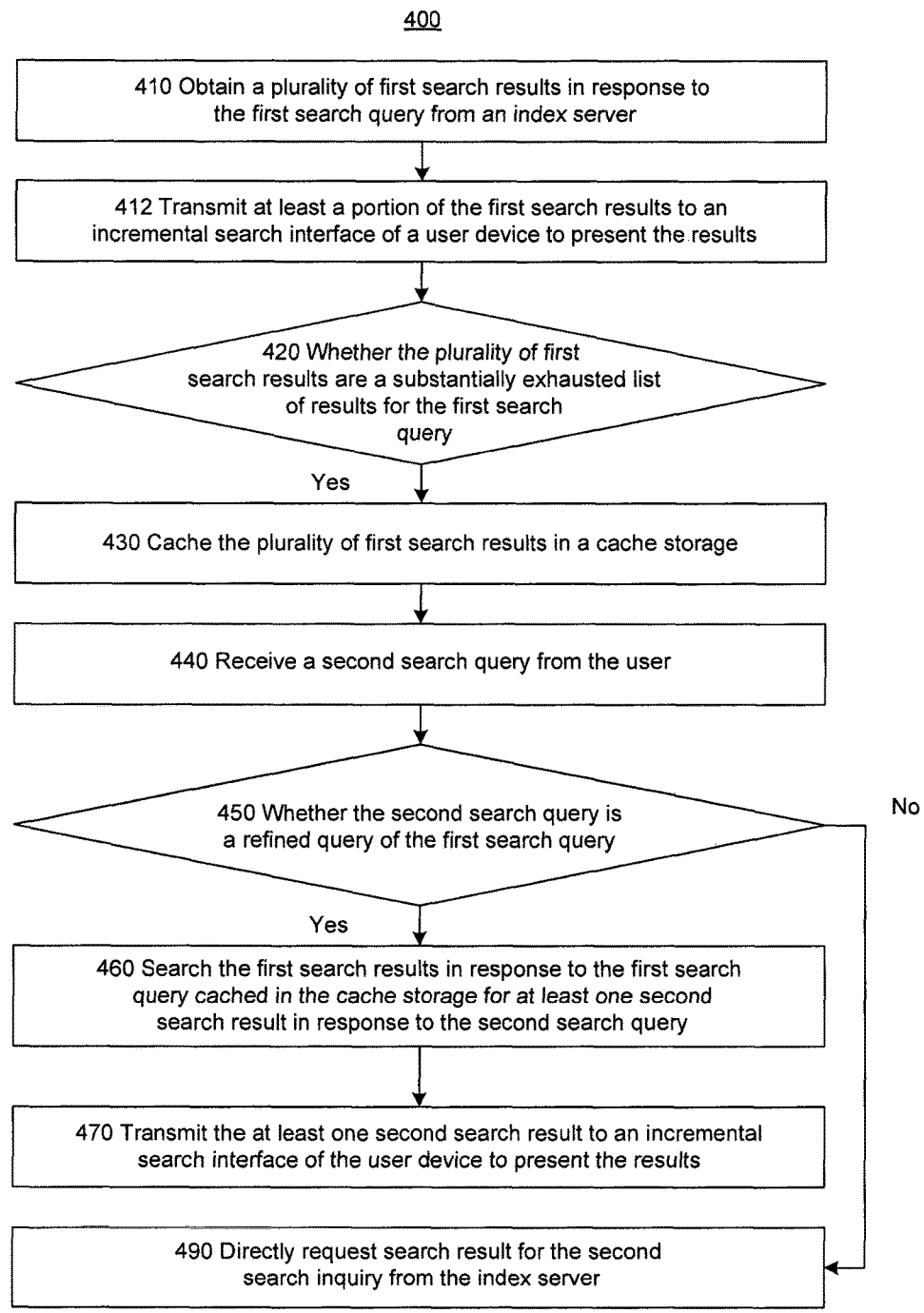
FIG. 4 is a high-level flowchart of an example process for handling incremental search queries.

FIG. 4 is a high-level flowchart of an example process 400 for handling incremental search queries, according to one embodiment. At step 405 of the process 400, an incremental search system receives a first search query from a user. The first search query is generated in real time when the user types one or more characters in the incremental search interface. The incremental search system is capable of presenting search results in real time as continuously receiving input characters as contents of search queries from the user.

At step 410, the incremental search system obtains a plurality of first search results in response to the first search query from an index server. At step 412, the incremental search system further transmits at least a portion of the first search results to an incremental search interface of a user device to present the results.

In one embodiment, the search results include social networking objects within a social network of a user. The search inquiry includes characters that form at least a portion of an identity of a social networking object.

At step 420, the incremental search system determines whether the plurality of first search results are a substantially exhausted list of results for the first search query. In one embodiment, if a number of the first search results is less than or equal to a predetermined proportion of a number of results requested from the index server, the first search results are a substantially exhausted list.

If the plurality of first search results are a substantially exhausted list of results for the first search query, the incremental search system continues to cache the plurality of first search results in a cache storage at step 430. In one embodiment, the cache storage is in the index server, and the cache storage utilizes a cache storage policy of Belady's algorithm, least recently used, most recently used, random replacement or other caching policies. The cache storage can purge the plurality of first search results after a predetermined time period (e.g. one minute).

At step 440, the incremental search system receives a second search query from the user. At step 450 the incremental search system determines whether the second search query is a refined query of the first search query. In one embodiment, the incremental search system determines that by generating one or more prefix queries by trimming one or more characters from an end of the second search query, calculating prefix hashes for the prefix queries; and determines whether one of the prefix hashes matches a hash of the first search query store in the index server. If a matched hash is found, the second search query is a refined query of the first search query. Otherwise, the system directly request search result for the second search inquiry from the index server at 490.

If the second search query is a refined query of the first search query, at step 460 the incremental search system continues to search the first search results in response to the first search query cached in the cache storage for at least one second search result in response to the second search query. The prefix hashes are calculated based on symbolic expressions for the prefix queries, and the hash of the first search query is calculated based on a symbolic expression for the first search query. A symbolic expression (also referred to as an s-expression) is a notation for nested list data (i.e. tree-structured data). Each symbolic expression defined inductively as an expression of other symbolic expressions or atomic units. The second search query is generated in real time when the user types one or more additional characters in the incremental search interface after the first search query being generated At step 470, the incremental search system further transmits the at least one second search result to an incremental search interface of the user device to present the results.

Figure 5:
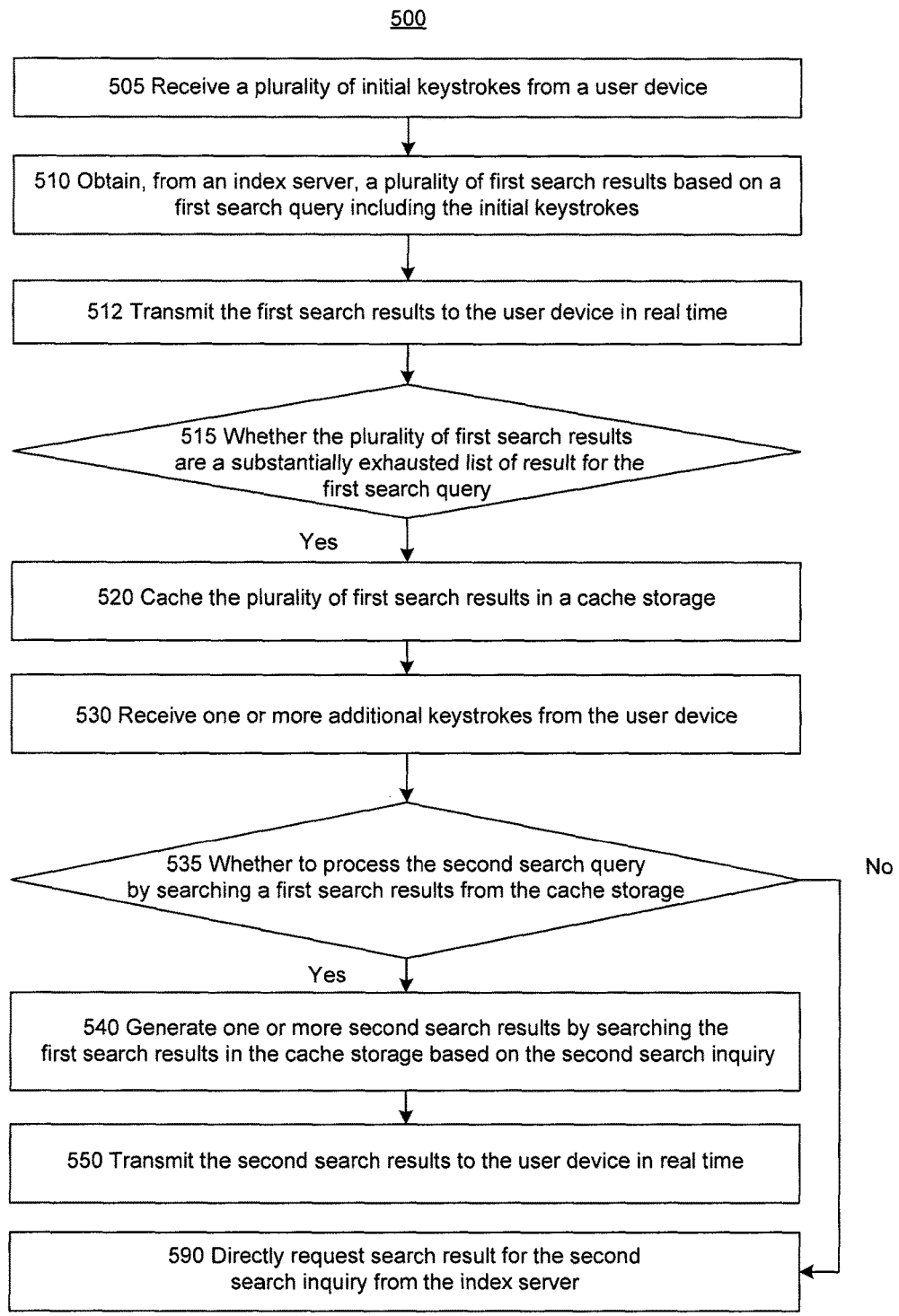
FIG. 5 is a high-level flowchart of another example process for handling incremental search queries.

FIG. 5 is a high-level flowchart of another example process 500 for handling incremental search queries. At step 505 of the process 400, an incremental search system receives a plurality of initial keystrokes from a user device. The user device is configured to provide an incremental search interface for a user to input the initial and additional keystrokes, and for presenting the first and second search results in real time as the user inputting the initial and additional keystrokes.

At step 510, the incremental search system obtains, from an index server, a plurality of first search results based on a first search query including the initial keystrokes. At step 512, the incremental search system transmits the first search results to the user device in real time.

At step 515, the incremental system determining whether the plurality of first search results are a substantially exhausted list of result for the first search query. In one embodiment, if a number of the first search results is less than or equal to a predetermined proportion of a number of results requested from the index server, the first search results are a substantially exhausted list.

If the first search results are a substantially exhausted list, at step 520, the incremental search system caches the plurality of first search results in a cache storage. At step 530, the incremental search system receives one or more additional keystrokes from the user device.

At step 535, the incremental search system determines whether to process the second search query by searching a first search results from the cache storage. The second search query includes the initial keystrokes and additional keystrokes. In one embodiment, the determining process includes generating one or more prefix queries by trimming one or more characters from an end of the second search query, calculating prefix hashes for the prefix queries, and determining whether one of the prefix hashes matches a hash of the first search query store in the index server. If there is a matched hash, the system determines to proceed to step 540. Otherwise, the system directly request search result for the second search inquiry from the index server at 590.

At step 540, the incremental search system generates one or more second search results by searching the first search results in the cache storage based on the second search inquiry. At step 550, the incremental search system transmits the second search results to the user device in real time.

Figure 6:
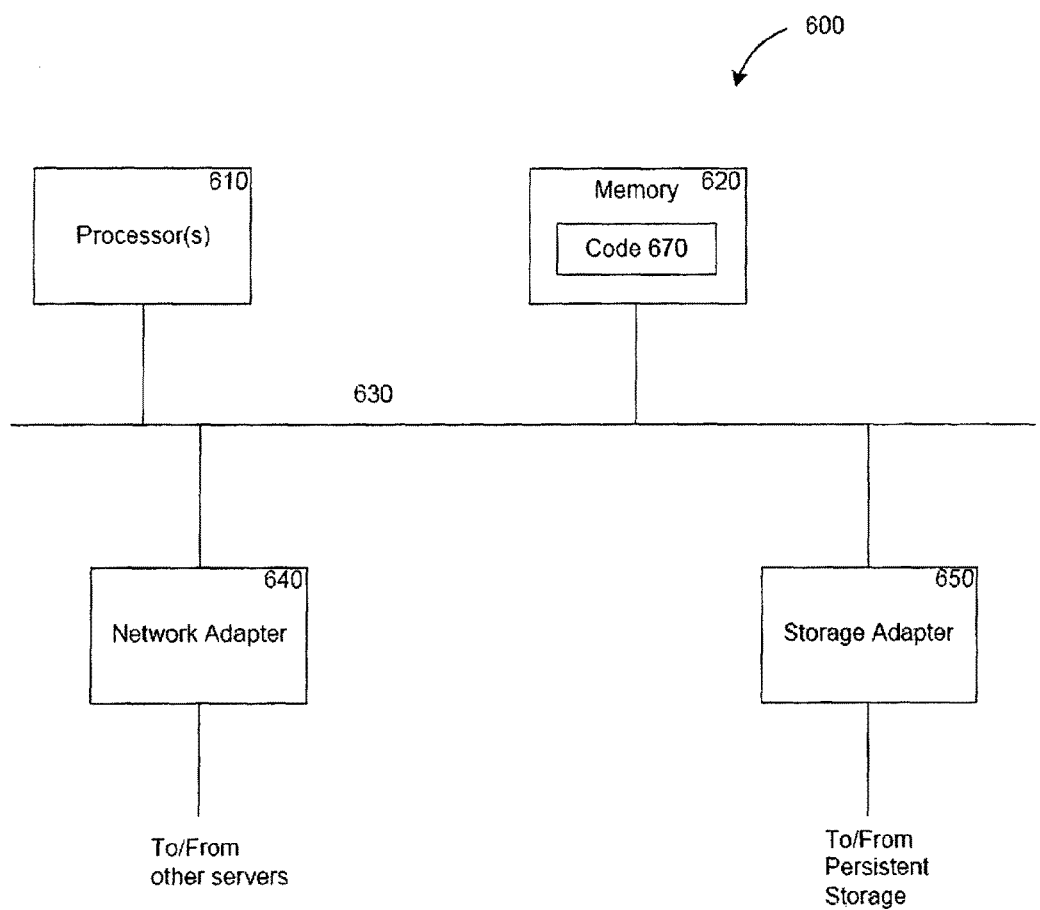
FIG. 6 is a high-level block diagram showing an example of the architecture of a computer server, which may represent any server described herein.

FIG. 6 is a high-level block diagram showing an example of the architecture of a computer server 600, which may represent any of the front end servers, or back end servers of the incremental search system. The server 600 includes one or more processors 610 and memory 620 coupled to an interconnect 630. The interconnect 630 shown in FIG. 6 is an abstraction that represents any one or more separate physical buses, point to point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 610 is/are the central processing unit (CPU) of the server 600 and, thus, control the overall operation of the server 600. In certain embodiments, the processor(s) 610 accomplish this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the server 600. The memory 620 represents any form of random access memory (RAM), read-only memory (ROM), flash memory, or the like, or a combination of such devices. In use, the memory 620 may contain, among other things, code 670 embodying at least a portion of an operating system of the server 600. Code 670 may also include instructions for executing the techniques disclosed herein.

Also connected to the processor(s) 610 through the interconnect 630 are a network adapter 640 and a storage adapter 650. The network adapter 640 provides the server 600 with the ability to communicate with devices, such as other user devices, front end servers, consolidating servers, data warehouse servers, or back end servers, over a network and may be, for example, an Ethernet adapter or Fibre Channel adapter. In some embodiments, a server may use more than one network adapter to deal with the communications within and outside of the data storage cluster separately. The storage adapter 650 allows the server 600 to access a persistent storage, and may be, for example, a Fibre Channel adapter or SCSI adapter. A cache storage may be included in the memory 620 or the storage adapter 650.

The code 670 stored in memory 620 may be implemented as software and/or firmware to program the processor(s) 610 to carry out actions described below. In certain embodiments, such software or firmware may be initially provided to the server 600 by downloading it from a system through the server 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A computer-implemented method comprising:
    receiving a first search query from a user;
    obtaining a plurality of first search results in response to the first search query from an index server;
    determining whether the plurality of first search results are a substantially exhausted list of results for the first search query;
    caching the plurality of first search results in a cache storage if the plurality of first search results are the substantially exhausted list of results for the first search query;
    receiving a second search query from the user;
    determining whether the second search query is a refined query of the first search query, wherein the determining comprises:
        generating one or more prefix queries based on the second search query;
        calculating prefix hashes for the prefix queries based on symbolic expressions for the prefix queries and a hash of the first search query based on a symbolic expression for the first search query; and
        determining whether one of the prefix hashes matches the hash of the first search query; and
    searching the plurality of first search results cached in the cache storage for at least one second search result in response to the second search query.

2. The computer-implemented method of claim 1, further comprising:
    presenting at least a portion of the first search results to an incremental search interface;
    wherein the first search query is generated in real time when the user types one or more characters in the incremental search interface.

3. The computer-implemented method of claim 1, further comprising:
    presenting the at least one second search result to an incremental search interface;
    wherein the second search query is generated in real time when the user types one or more additional characters in the incremental search interface after the first search query being generated.

4. The computer-implemented method of claim 1, wherein the step of determining whether the plurality of first search results are a substantially exhausted list of results for the first search query further includes:
    determining whether a number of the first search results is less than or equal to a predetermined proportion of a number of results requested from the index server.

5. The computer-implemented method of claim 1, wherein the cache storage is in the index server, and the cache storage utilizes a cache storage policy of Belady's algorithm, least recently used, most recently used, or random replacement.

6. The computer-implemented method of claim 1, wherein the cache storage purges the plurality of first search results after a predetermined time period.

7. The computer-implemented method of claim 1, wherein presenting search results in real time as continuously receiving input characters as contents of search queries from the user.

8. A method for incremental search comprising:
    receiving a plurality of initial keystrokes from a user device;
    obtaining, from an index server, a plurality of first search results based on a first search query including the initial keystrokes;
    caching the plurality of first search results in a cache storage;
    receiving one or more additional keystrokes from the user device;
    generating one or more second search results by searching the first search results in the cache storage based on a second search query including the initial keystrokes and additional keystrokes;
    determining whether the plurality of first search results are a substantially exhausted list of result for the first search query, wherein a number of the first search results is less than or equal to a predetermined proportion of a number of results requested from the index server;
    determining whether to process the second search query by searching the first search results from the cache storage, wherein the determining comprises:
        generating one or more prefix queries based on the second search query;
        calculating prefix hashes for the prefix queries based on symbolic expressions for the prefix queries and a hash of the first search query based on a symbolic expression for the first search query; and
        determining whether one of the prefix hashes matches the hash of the first search query; and
    transmitting the second search results to the user device in real time.

9. The method of claim 8, further comprising:
    transmitting the first search results to the user device in real time.

10. The method of claim 8, wherein the user device is configured to provide an incremental search interface for a user to input the initial and additional keystrokes, and for presenting the first and second search results in real time as the user inputting the initial and additional keystrokes.

11. A computer server for incremental search comprising:
    a networking component configured for receiving a plurality of initial keystrokes and later one or more additional keystrokes from a user device;
    the networking component being further configured for obtaining from an index server a plurality of first search results based on a first search query including the initial keystrokes;
    a cache storage configured for caching the plurality of first search results;
    a processor; and a memory storing instructions which, when executed by the processor, cause the computer server to perform a process including:

generating one or more second search results by searching the first search results in the cache storage based on a second search query including the initial keystrokes and additional keystrokes;

determining whether the plurality of first search results are a substantially exhausted list of result for the first search query, wherein a number of the first search results is less than or equal to a predetermined proportion of a number of results requested from the index server;

determining processing the second search query by searching the first search results from the cache storage, wherein the determining comprise:

generating one or more prefix queries by trimming one or more characters from an end of the second search query;

calculating prefix hashes for the prefix queries based on symbolic expressions for the prefix queries and a hash of the first search query based on a symbolic expression for the first search query; and determining whether one of the prefix hashes matches a hash of the first search query stored in the index server; and wherein the networking component is further configured for transmitting the second search results to the user device in real time.

12. The computer server of claim 11, wherein the first search results include social networking objects within a social network of a user.

13. The computer server of claim 11, wherein the initial keystrokes form at least a portion of an identity of a social networking object.

* * * * *